E. B. BERRY.
LOCKING BOLT AND NUT.
APPLICATION FILED MAR. 12, 1915.
1,188,611.
Patented June 27, 1916.
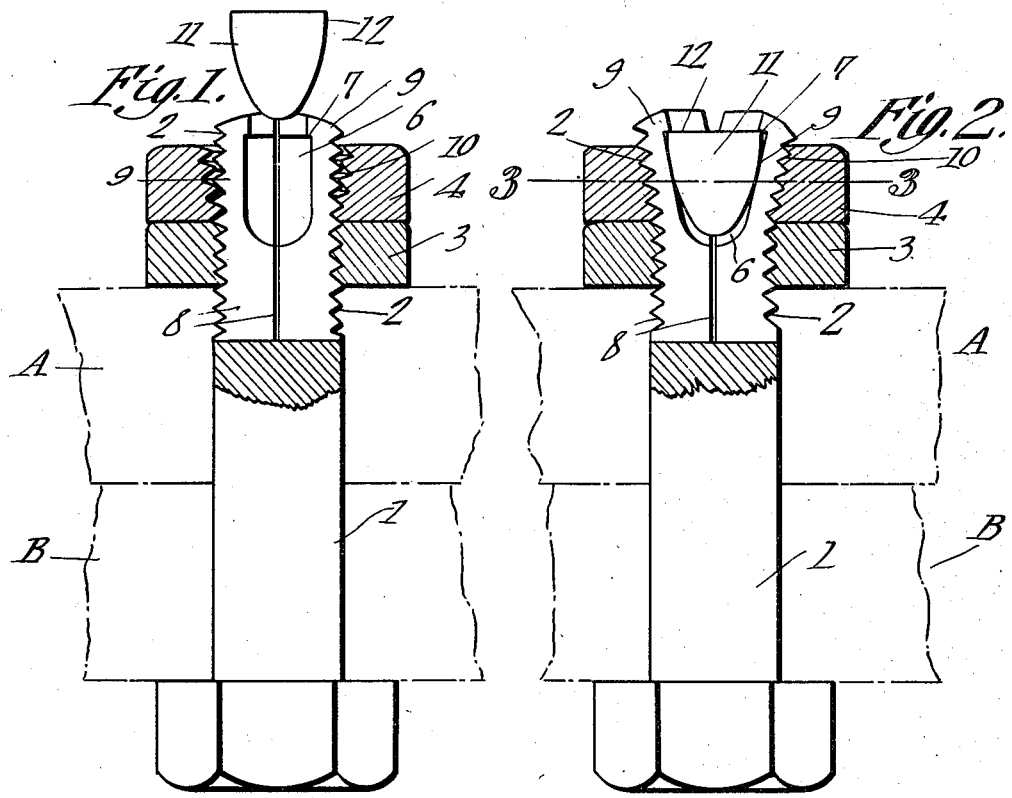
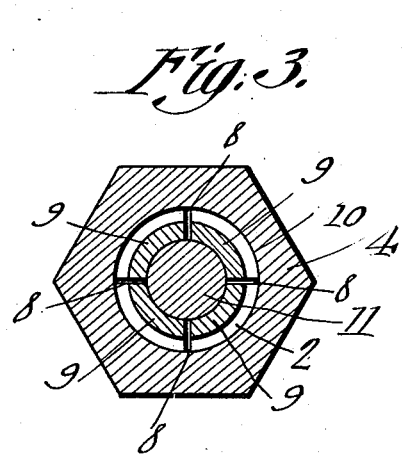
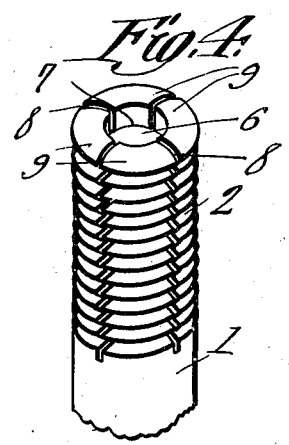
E. B. Berry
Inventor
Witnesses
by
Attorneys

UNITED STATES PATENT OFFICE.

ERNEST B. BERRY, OF MIAMI, OKLAHOMA, ASSIGNOR OF ONE-HALF TO DAN O. GENTES OF MIAMI, OKLAHOMA.

LOCKING BOLT AND NUT.

1,188,611.　　　Specification of Letters Patent.　　Patented June 27, 1916.

Application filed March 12, 1915. Serial No. 13,880.

*To all whom it may concern:*

Be it known that I, ERNEST B. BERRY, a citizen of the United States, residing at Miami, in the county of Ottawa and State of Oklahoma, have invented a new and useful Locking Bolt and Nut, of which the following is a specification.

This invention relates to a locking bolt and nut, one object of which is to provide means for securing a nut upon a bolt in a manner to obviate the possibility of any retrograde movement or unscrewing of said nut upon the bolt, under any condition to which devices of this character are subjected.

A further object of the present invention is to provide a lock bolt and nut of general improved construction, whereby the device will be simple, durable and inexpensive in construction, as well as convenient, practical, serviceable and efficient in its use.

With the foregoing and other objects in view which will appear as the description proceeds, the invention resides in the combination and arrangement of parts and in the details of construction hereinafter described and claimed, it being noted that changes in the precise embodiment of the invention herein disclosed can be made within the scope of what is claimed without departing from the spirit of the invention.

The invention has been illustrated in its preferred embodiments in the accompanying drawings, wherein—

Figure 1 is a longitudinal section through the improved bolt and nut with the component members in their initial positions preparatory to inserting the locking plug. Fig. 2 is a similar view to Fig. 1, but depicting the component members in their locked position. Fig. 3 is a transverse section taken on the line 3—3 of Fig. 2. Fig. 4 is a detail perspective view of the threaded end of the lock bolt.

In carrying out the present invention, there is provided a bolt 1, having threads 2 formed upon one end thereof for the reception of a cylindrical threaded bore jam nut 3, and a tapered or frusto-conical threaded jam nut 4.

The outer or threaded end of the bolt 1 is provided with an axial cylindrical bore or recess 6, which is reduced at its outer or open end to form a shoulder 7. A plurality of diametrically opposed radial slits 8 are formed in the threaded end of the bolt 1 to define a plurality of elongated threaded fingers or prongs 9.

In order to force the threads 2 of the elongated fingers 9 into positive engagement with the threads 10 of the tapered or frusto-conical bore of the jam nut 4, there is provided a tapered or conoidal plug 11, having an abrupt shoulder 12 formed at one end thereof.

In practical operation, the bolt 1 is placed in suitable apertures in the material A and B, which is to be secured by said bolt. The jam nuts 3 and 4 are then placed upon the threaded end of the bolt 1 and screwed "home" to exert the desired pressure upon the members A and B.

In order to positively secure the nuts 3 and 4 upon the bolt 1, the plug 11 is driven into the recess 6, which is of less diameter than the greater diameter of said plug, until the shoulder 12 formed upon the plug 11 snaps under the shoulder 7 formed at the outer end of the recess 6. This operation spreads the terminals of the fingers or prongs 9 sufficient to force their threads 2 into engagement with the threads 10 of the nut 4, thereby locking all the component members of this invention together to insure against any retrograde movement or unscrewing of the nuts 3 and 4 upon the bolt 1.

Having thus described the invention, what is claimed as new is:

1. In a device of the character described including a bolt having a resilient end and a recess extending inwardly from the resilient end for the reception of a rigid expanding member; a permanent overhang formed at the resilient end of the bolt and extending into the recess for engaging and holding the rigid expanding member against retrograde movement.

2. In a device of the character described including a bolt having a resilient end and a recess extending inwardly from the resilient end; a permanent overhang formed at the resilient end and extending into the said recess; a nut screwed upon the said bolt and about the recess; a rigid plug adapted to be driven into the recess until the said plug snaps behind the permanent overhang and there held against retrograde movement by the permanent overhang, said rigid plug is also adapted to expand the resilient end of the bolt into engagement with the nut.

3. In a device of the character described, including a bolt; resilient fingers extending longitudinally from the bolt, said fingers having recesses formed adjacent the outer ends thereof for the reception of a rigid expanding member; permanent overhangs extending inwardly from the free ends of the resilient fingers and into the said recesses for engaging and holding the rigid expanding member against retrogade movement.

4. In a device of the character described, including a bolt, resilient fingers extending longitudinally from the bolt, said fingers having recesses formed adjacent the free ends thereof; permanent overhangs extending inwardly from the free ends of the resilient fingers and into the said recesses; a rigid plug adapted to be driven into the recesses until the rigid plug snaps behind the permanent overhang, where it is held against retrograde movement by the said permanent overhang, the tapered plug being also adapted to expand the resilient fingers into engagement with the nut.

In testimony that I claim the foregoing as my own, I have hereto affixed my signature in the presence of two witnesses.

ERNEST B. BERRY.

Witnesses:
 JOHN L. CRANK,
 G. W. PECK.